United States Patent
Sung et al.

(10) Patent No.: US 9,191,858 B1
(45) Date of Patent: Nov. 17, 2015

(54) BROADCAST CELL LOADING INFORMATION FOR WIRELESS NETWORK ACCESS AND HANDOFF

(71) Applicant: Sprint Spectrum LP, Overland Park, KS (US)

(72) Inventors: Sanghoon Sung, Ashburn, VA (US); Yun Sung Kim, Ashburn, VA (US); Hau Tran, Centerville, VA (US); Munawar Uddin, Naperville, IL (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 14/284,656

(22) Filed: May 22, 2014

(51) Int. Cl.
| | |
|---|---|
| H04L 12/28 | (2006.01) |
| H04W 4/00 | (2009.01) |
| H04W 36/00 | (2009.01) |
| H04W 72/00 | (2009.01) |
| H04W 28/08 | (2009.01) |
| H04W 36/22 | (2009.01) |

(52) U.S. Cl.
CPC ............ *H04W 28/085* (2013.01); *H04W 36/22* (2013.01)

(58) Field of Classification Search
CPC ............ H04W 24/02; H04W 28/0236; H04W 36/0055; H04W 36/0083; H04W 36/0094; H04W 36/22; H04W 36/26; H04W 36/30; H04B 7/18539
USPC ................. 370/229–239, 310–350, 431–437; 455/431–464; 709/223–237, 249–250
See application file for complete search history.

(56) References Cited

U.S. PATENT DOCUMENTS

| | | | |
|---|---|---|---|
| 6,985,740 B2* | 1/2006 | Shyy et al. | 455/453 |
| 7,317,917 B2* | 1/2008 | Qian et al. | 455/432.1 |
| 8,467,798 B2* | 6/2013 | Lee et al. | 455/450 |
| 8,817,751 B2* | 8/2014 | Zhang et al. | 370/332 |
| 2008/0227453 A1* | 9/2008 | Somasundaram et al. | 455/436 |
| 2009/0080342 A1* | 3/2009 | Frederiksen et al. | 370/253 |
| 2011/0053598 A1* | 3/2011 | Ahluwalia | 455/436 |
| 2012/0202504 A1* | 8/2012 | Wegmann et al. | 455/438 |
| 2013/0084864 A1* | 4/2013 | Agrawal et al. | 455/436 |
| 2013/0242966 A1* | 9/2013 | Zhou et al. | 370/338 |
| 2014/0128074 A1* | 5/2014 | Vangala et al. | 455/436 |
| 2014/0187243 A1* | 7/2014 | Rune et al. | 455/436 |
| 2014/0213249 A1* | 7/2014 | Kang et al. | 455/434 |
| 2014/0293776 A1* | 10/2014 | Yang et al. | 370/229 |
| 2015/0126193 A1* | 5/2015 | Huang et al. | 455/436 |

OTHER PUBLICATIONS

LTE;General Packet Radio Service (GPRS) enhancements for Evolved Universal Terrestrial Radio Access Network (EUTRAN) access, 3GPP TS 23.401, version 9.15.0 Release 9, pp. 1-258, 2013.
LTE; Evolved Universal Terrestrial Radio Access (E-UTRA); User Equipment (UE) procedures in idle mode, 3GPP TS 36.304 version 9.11.0 Release 9, pp. 1-34, 2012.

* cited by examiner

Primary Examiner — Tri H Phan

(57) ABSTRACT

A system information message is received by a wireless device. The system information message was broadcast from a first access node using a first frequency band. Cell loading information is extracted from the system information message. Based on the cell loading information, it is determined whether to connect the wireless device to the first access node using the first frequency band, or to a second access node using a second frequency band. The second access node is also broadcasting system information messages that include cell loading information.

14 Claims, 6 Drawing Sheets

BROADCAST CELL LOADING INFORMATION FOR WIRELESS NETWORK ACCESS AND HANDOFF

TECHNICAL BACKGROUND

Wireless communication may be used as a means of accessing a network. Wireless communication has certain advantages over wired communications for accessing a network. One of those advantages is a lower cost of infrastructure to provide access to many separate locations or addresses compared to wired communications. This is the so-called "last mile" problem. Another advantage is mobility. Wireless communication devices, such as cell phones, are not tied by wires to a fixed location. To use wireless communication to access a network, a customer needs to have at least one transceiver in active communication with another transceiver that is connected to the network.

To facilitate wireless communications, the Institute of Electrical and Electronics Engineers (IEEE) has promulgated a number of wireless standards. These include the 802.11 (WiFi) standards and the 802.16 (WiMAX) standards. Likewise, the International Telecommunication Union (ITU) has promulgated standards to facilitate wireless communications. This includes TIA-856, which is also known as Evolution-Data Optimized (EV-DO). The European Telecommunications Standards Institute (ETSI) has also promulgated a standard known as long term evolution (LTE). Additional standards such as the fourth generation communication system (4G) are also being pursued. These standards pursue the aim of providing a comprehensive IP solution where voice, data, and streamed multimedia can be given to users on an "anytime, anywhere" basis. These standards also aim to provide higher data rates than previous generations. All of these standards may include specifications for various aspects of wireless communication with a network. These aspects include processes for registering on the network, carrier modulation, frequency bands of operation, and message formats.

In certain wireless network deployments, coverage for an area may be provided by more than one frequency band (e.g., 800 MHz and 1.9 GHZ, etc.). These different frequency bands can have different propagation characteristics. This can result in uneven coverage areas for the different frequency bands.

Overview

In an embodiment, a method of operating a communication system, includes receiving, by a wireless device, a system information message from a first access node using a first frequency band. Cell loading information is extracted from the system information message. Based on the cell loading information, it is determined whether to connect the wireless device to the first access node using the first frequency band.

In an embodiment, a method of operating a communication system, includes receiving an indicator that a handover threshold criteria associated with a first access node serving a wireless device using a first frequency band has been met by a first signal quality level. In response to the handover threshold criteria being met, whether a second signal quality level of a second access node using a second frequency band meets a signal quality threshold criteria is determined. A first system information message from the second access node using the second frequency band is received by the wireless device. First cell loading information is extracted from the first system information message. Based on the first cell loading information, whether to initiate a handover of the wireless device from the first access node to the second access node is determined.

In an embodiment, a first access node is configured to broadcast first cell loading information and to serve a wireless device using a first frequency band. A second access node is configured to broadcast second cell loading information to the wireless device using a second frequency band. The wireless device is configured to use the first cell loading information and the second cell loading information to determine whether to initiate a handoff from the first access node to the second access node.

DETAILED DESCRIPTION

In an embodiment, information about cell loading (e.g., number of users, congestion, utilization of air-interface resources) is broadcast by access nodes as part of system information messages. A target minimum data rate service quality (e.g., best efforts, guaranteed minimum bitrate) is also broadcast as part of system information messages. The cell loading information and the target minimum data rate service quality is used by wireless devices as inputs to the cell selection process for network entry and/or for target cell selection for handover. This allows a wireless device either entering the network, or considering a handover, to avoid congested cells and/or cells that cannot supply the wireless device's required service quality.

Figure 1:
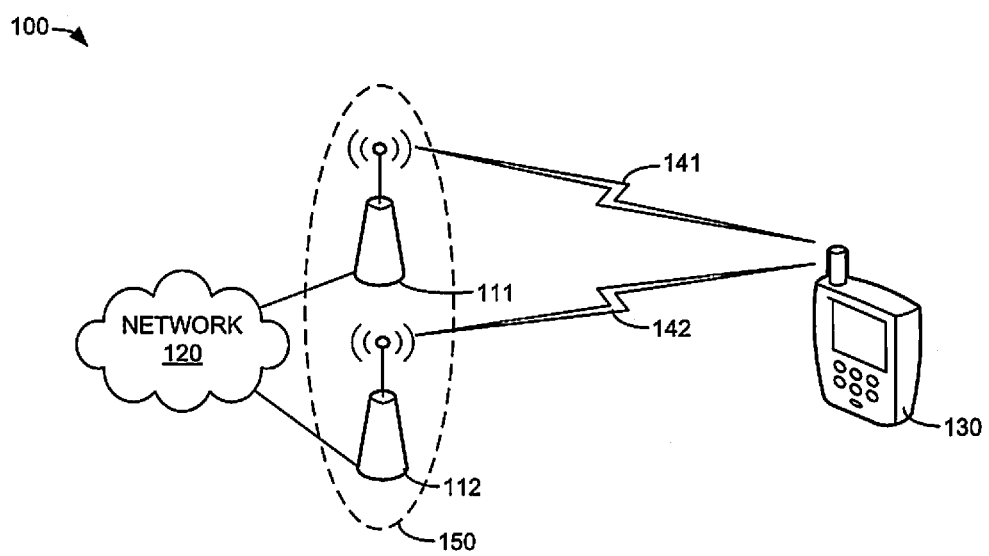
FIG. 1 is a block diagram illustrating a communication system.

FIG. 1 is a block diagram illustrating a communication system. In FIG. 1, communication system 100 comprises access node 111, access node 112, wireless device 130, and network 120. Access node 111 and access node 112 may be co-located. In other words, access node 111 and access node 112 may share physical transmission/reception facilities such as an antenna tower. Thus, access node 111 and access node 112 may have similar coverage areas. The optional co-location of access node 111 and access node 112 is illustrated in FIG. 1 by dashed oval 150. Access node 111 and access node 112 operate using different frequency bands (e.g., access node 111 may use the 800 MHz band and access node 112 may use the 1.9 GHz band).

Wireless device 130 can be operatively coupled to access node 111 via wireless link 141. Wireless device 130 can be operatively coupled to access node 112 via wireless link 142. Access node 111 and access node 112 are operatively coupled to network 120.

Access node 111 and access node 112 are network nodes capable of providing wireless communication to wireless device 130. Access node 111 communicates with wireless device 130 via wireless link 140 using a first frequency band. Access node 112 communicates with wireless device 130 via wireless link 141 using a second frequency band. Examples of access nodes, base stations, and wireless stations that may be utilized include, base transceiver stations (BTSs), radio base stations (RBSs), Node B, enhanced Node B (eNBs) and others. Access nodes, base stations, and wireless stations may include a number of elements known to those skilled in the art comprising a transceiver, power amplifier, combiner, duplexer, antenna and control function.

Network 120 is a communication network that can provide communication between access node 111, access node 112, and other wired or wireless networks. Communication system 100 can comprise wired and/or wireless communication networks that include processing nodes, routers, gateways, physical and/or wireless data links for carrying data among various network elements, including combinations thereof, and can include a local area network, a wide area network, and an internetwork (including the Internet). Communication system 100 can also comprise wireless networks, including base station, wireless communication nodes, telephony switches, internet routers, network gateways, computer systems, communication links, or some other type of communication equipment, and combinations thereof.

Wired network protocols that may be utilized by communication system 100 and/or network 120 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols that may be utilized by communication system 100 and/or network 120 may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Other network elements may be present in communication system 100 (and present in wireless network 120, in particular) to facilitate wireless communication to/from wireless device 130 but are omitted for clarity, such as base stations, base station controllers, gateways, mobile switching centers, dispatch application processors, and location registers such as a home location register or visitor location register. Furthermore, other network elements may be present to facilitate communication between access node 111, access node 112, and network 120 which are omitted for clarity, including additional processing nodes, routers, gateways, and physical and/or wireless data links for carrying data among the various network elements.

In an embodiment, access node 111 communicates with wireless device 130 via wireless link 141 using a first air-interface frequency band. Access node 112 communicates with wireless device 130 via wireless link 142 using a second air-interface frequency band. For example, access node 111 may communicate with wireless device 130 (and other wireless devices, not shown in FIG. 1) using the 800 MHz frequency band while access node 112 may communicate with wireless device 130 (and other wireless devices, not shown in FIG. 1) using the 1.9 GHz frequency band. Access node 111 and access node 112 may use separate antennas.

Wireless device 130 may be any device, system, combination of devices, or other such communication platform capable of communicating with access node 111 and access node 112, and via wireless links 141 and 142, respectively. As discussed above, wireless links 141 and 142 provide communication between wireless device 130 and a respective access node 111 and 112 using two different air-interface frequency bands. These air-interface frequency bands may have different propagation characteristics. Thus, even when access node 111 and access node 112 are co-located, access node 111 and access node 112 may have different coverage areas, and/or have different coverage (e.g., signal strength) patterns within those coverage areas.

Wireless device 130 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange data with access node 111 and access node 112 via wireless links 141 and 142, respectively. Other types of communication platforms are possible.

In an embodiment, access node 111 and access node 112 broadcast, as part of system information messages, information relating to the loading on a respective access node 111 and access node 112. This information (cell loading information) may include indicators corresponding to a number of users, channel resource utilization, and/or service bearers. Access node 111 and access node 112 also broadcast, as part of system information messages, information about a target minimum data rate service quality.

Wireless device 130 receives a first system information message from access node 111 containing first cell loading information associated with access node 111, and an indicator of a first minimum target service data rate. Wireless device 130 receives the first system information message from access node 111 via wireless link 141 on a first frequency band. Wireless device 130 receives a second system information message from access node 112 containing second cell loading information associated with access node 112, and an indicator of a second minimum target service data rate. Wireless device 130 receives the second system information message from access node 112 via wireless link 142 on a second frequency band. The first minimum target service data rate is associated with access node 111. The first minimum target service data rate can depend on the channel bandwidth of the first frequency band and the specifications of wireless device 130. The second minimum target service data rate is associated with access node 112. The second minimum target service data rate can depend on the channel bandwidth of the second frequency band and the specifications of wireless device 130.

In an embodiment, the cell loading information extracted by wireless device 130 from the first system information message and the second system information message may include indicators of one or more of: (i) overall cell loading quality (e.g., high, medium, low); (ii) overall available physical channel bandwidth resources (i.e., air-interface resources); (iii) an indicator of the number of connected wireless devices to a respective access node 111 and 112; and, (iv), an indicator of the already dedicated channel bandwidth resources for guaranteed bit rate (GBR) quality of service (QoS).

When wireless device 130 is seeking network entry, wireless device 130 makes RF signal quality (i.e., air-interface quality) measurements of wireless link 141 to determine whether wireless link 141 meets the minimum requirements for network entry using access node 111. Wireless device 130 also checks the first cell loading information to determine whether wireless device 130 can, using wireless link 141, meet the first minimum target service data rate received from access node 111.

If wireless device 130 determines from the cell loading information that access node 111 cannot meet the first minimum target service data rate (i.e., access node 111 is congested), then wireless device 130 makes RF signal quality (i.e., air-interface quality) measurements of wireless link 142 to determine whether wireless link 142 meets the minimum requirements for network entry using access node 112. Wireless device 130 also checks the second cell loading information to determine whether wireless device 130 can meet the second minimum target service data rate received from access node 112 using wireless link 142.

In an embodiment, wireless device 130 selects, based on air-interface characteristics (e.g., signal strength of wireless link 141), access node 111 as a first choice to be its serving cell. If the cell loading information received by wireless device 130 from access node 111 indicates that access node 111 and wireless device 130 will not be able to meet the target service data rate broadcast by access node 111, then wireless device 130 proceeds to scan for another access node on another frequency band (i.e., access node 112 on the second frequency band).

In an embodiment, to determine an access node (e.g., access node 112) to serve wireless device 130, communication system 100 may perform the following:

(A) Wireless device 130 extracts cell loading information from system information messages broadcast by access node 112.

(B) If the cell loading information associated with access node 112 indicates that access node 112 is "highly" loaded, wireless device 130 stops considering access node 112 as a candidate to service wireless device 130.

(C) If the cell loading information associated with access node 112 indicates that access node 112 is not "highly" loaded, wireless device 130 checks if guaranteed bit rate service is required.

(D) If wireless device 130 needs to be serviced by guaranteed bit rate QoS, wireless device 130 calculates the expected quality of service data rate. This calculation uses both cell loading information received from access node 112 and air-interface quality measure(s). For example, the expected QoS data rate (EDR) can be calculates as: EDR=(TCB−DCB)*(PDR/UCB), where TCB=total channel bandwidth; DCB=dedicated channel bandwidth for QoS; and, PDR/UCB is related to channel quality information (CQI). CQI is wireless device 130's requested modulation and coding scheme (MCS)—which can be based on RF signal quality measures such as signal to noise ratio (SNR), signal to interference and noise ratio (SINR), carrier to interference and noise ratio (CINR), etc.

(E) If wireless device 130 does not require guaranteed bit rate service, wireless device 130 calculates the expected best effort data rate. This calculation is made using both cell loading information received from access node 112 and air-interface quality measure(s).

(F) Wireless device 130 compares the appropriate calculated expected data rate from steps (D) or (E) against the minimum service target data rate broadcast by access node 112. Wireless device 130 may determine that the expected data rate is sufficient when the calculated expected data rate exceeds the minimum service target data rate by a tolerance level. The tolerance level may be a setting specific to wireless device 130.

(G) If the expected data rate is sufficient, wireless device 130 selects access node 112 to serve wireless device 130.

(H) If the expected data rate is not sufficient, wireless device saves access node 112 as a possible candidate and continues to search for additional access nodes (not shown in FIG. 1). When wireless device 130 cannot find a suitable access node after carrier searching, wireless device 130 selects an access node with the best expected data rate from the candidate list.

In an embodiment, wireless device 130 is being served by access node 111. In order to determine an new access node to serve wireless device 130 (e.g., access node 112), communication system 100 may perform the following:

(I) Wireless device 130 continues to be served by access node 111 on the first frequency band until either (a) the received signal quality from access node 111 drops below a threshold criteria, or (b) the data rate wireless device 130 experiences communicating with access node 111 drops below the minimum target service data rate broadcast by access node 111.

(II) When either (a) or (b) conditions are met, wireless device 130 searches for candidate access nodes that have (i) a minimum RF signal quality, and (ii) an expected data rate that is sufficient to meet the minimum service data rate broadcast by the candidate cell.

(III) Wireless device 130 reports to access node 111 each access node that satisfies (i) and (ii). Wireless device 130 may prioritize these access nodes based on RF signal quality and/or based on expected data rate. In an embodiment, if the search procedure was triggered by an RF signal quality issue (i.e., condition (a), above), prioritization is by RF signal quality. Otherwise, prioritization of the candidate access nodes is by expected data rate.

(IV) Access node 111 determines which of the access nodes should serve wireless device 130. In an embodiment, access node 111 selects the access node with the highest priority to serve wireless device 130. In this manner, the target access node is less likely to reject wireless device 130 due to cell loading since wireless device 130 has checked the cell loading of the target access node prior to reporting the candidate list of access nodes to access node 111.

Figure 2:
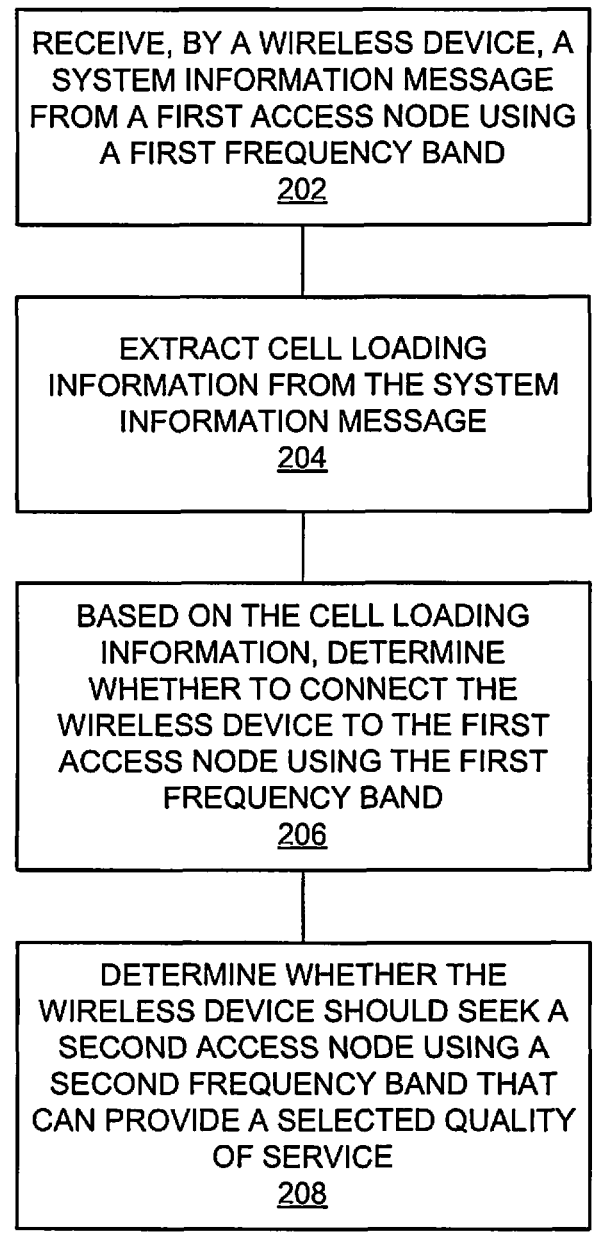
FIG. 2 is a flowchart illustrating a method of operating a communication system.

FIG. 2 is a flowchart illustrating a method of operating a communication system. The steps illustrated in FIG. 2 may be performed by one or more elements of communication system 100. By a wireless device, a system information message from a first access node is received using a first frequency band (202). For example, wireless device 130 may receive, from access node 111, a system information block broadcast by access node 111 on a first frequency band. The system information block may include information to help wireless device 130 connect to access node 111 and network 120. The system information blocks broadcast by access node 111 also contain cell loading information and/or minimum target service data rate information.

Cell loading information is extracted from the system information block (204). For example, wireless device 130 can extract cell loading information from a system information block broadcast by access node 111. This cell loading information may include indicators corresponding to the number of users, the channel resource utilization, and/or the number service bearers in use.

Based on the cell loading information, whether to connect the wireless device to the first access node using the first frequency band is determined (206). For example, wireless device 130, based on cell loading information extracted from the system information block broadcast by access node 111, may determine whether to connect to access node 111. Wireless device 130 may determine to connect to access node 111 because access node 111 can provide an expected data rate that is sufficient for wireless device 130's requirements. Wireless device 130 may determine to connect to access node 111 because an expected data associated with access node 111 is sufficient to meet a minimum target service data rate broadcast by access node 111.

Whether the wireless device should seek a second access node using a second frequency band that can provide a selected quality of service is determined (208). For example, wireless device 130 can determine whether wireless device 130 should scan to find out whether access node 112 can be expected to provide a selected quality of service. Wireless device 130 may determine to scan to find out whether access node 112 can provide a selected quality of service when (a) the received signal quality from access node 111 drops below a threshold criteria, or (b) the data rate wireless device 130 experiences communicating with access node 111 drops below a minimum target service data rate broadcast by access node 111.

Figure 3:
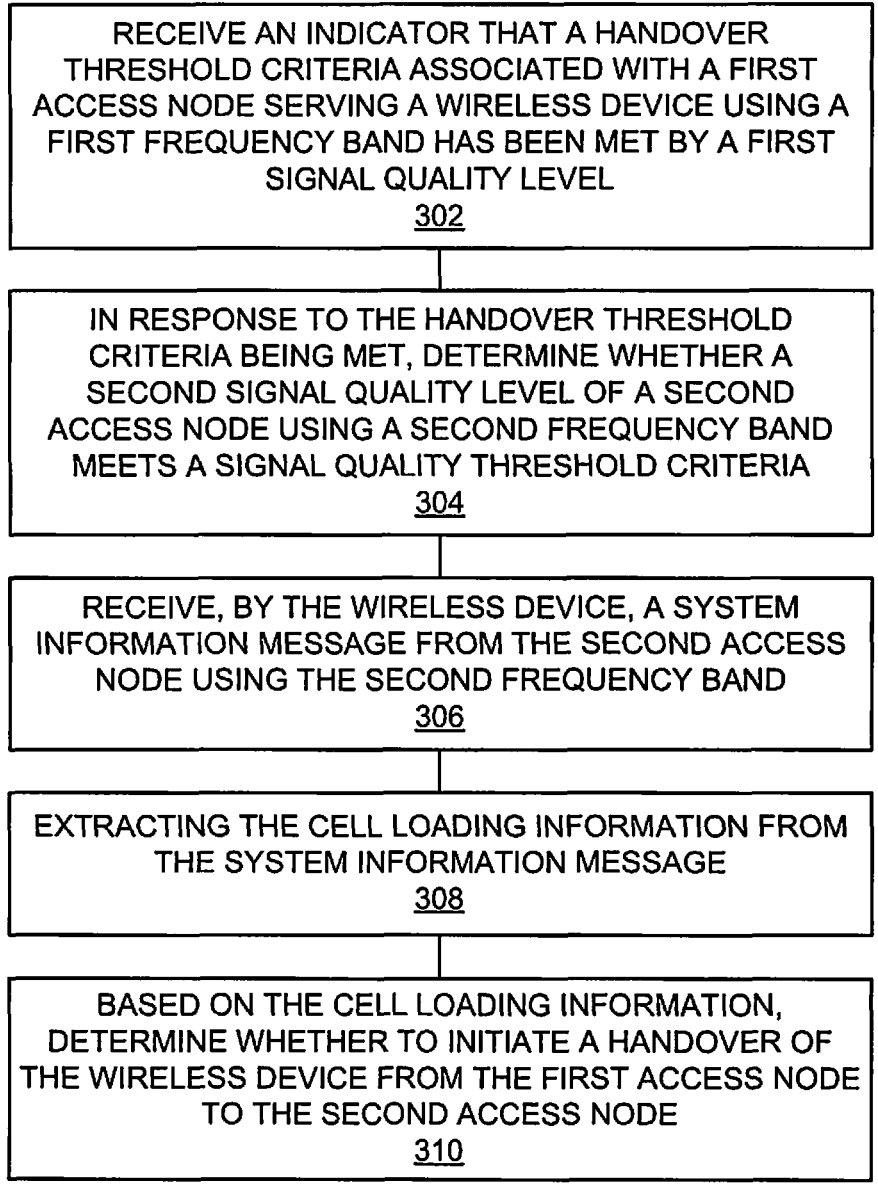
FIG. 3 is a flowchart illustrating a method of initiating a handover.

FIG. 3 is a flowchart illustrating a method of initiating a handover. The steps illustrated in FIG. 2 may be performed by one or more elements of communication system 100. An indicator that a handover threshold criteria associated with a first access node serving a wireless device using a first frequency band has been met by a first signal quality level is received (302). For example, wireless device 130 may calculate an indicator that scanning should begin because (a) the received signal quality from access node 111 dropped below a threshold criteria, or (b) the data rate wireless device 130 is experiencing communicating with access node 111 dropped below a minimum target service data rate broadcast by access node 111.

In response to the handover threshold criteria being met, whether a second signal quality level of a second access node using a second frequency band meets a signal quality threshold criteria is determined (304). For example, in response to the handover threshold criteria being met, wireless device 130 may determine during scanning whether access node 112 meets a minimum RF signal quality.

By the wireless device, a system information message from the second access node is received using the second frequency band (306). For example, wireless device 130 can receive a system information block from access node 112 via wireless link 142. Cell loading information is extracted from the system information message (308). For example, wireless device 130 may extract cell loading information from a system information block received from access node 112.

Based on the cell loading information, whether to initiate a handover of the wireless device from the first access node to the second access node is determined (310). For example, wireless device 130 may, based on the cell loading information, determine an expected data rate associated with access node 112. If the expected data rate meets certain threshold criteria, wireless device 130 can determine to initiate a handover to access node 112. Wireless device may determine to initiate a handover to access node 112 when the expected data rate associated with access node 112 is sufficient to meet the minimum service data rate broadcast by access node 112.

Figure 4:
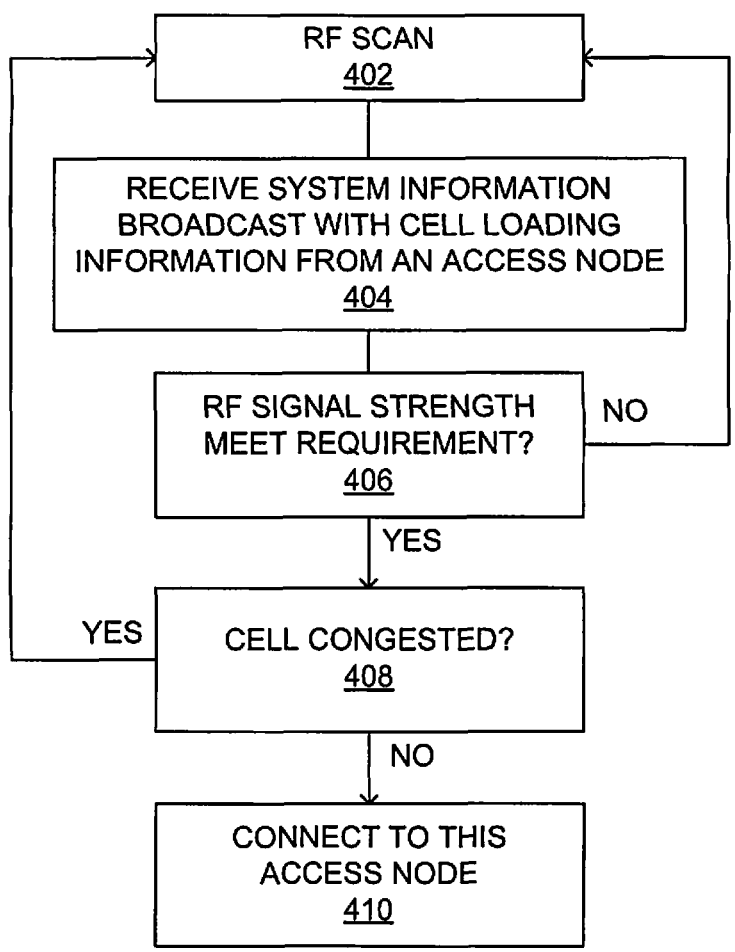
FIG. 4 is a flowchart illustrating a method of accessing a communication system.

FIG. 4 is a flowchart illustrating a method of accessing a communication system. The steps illustrated in FIG. 4 may be performed by one or more elements of communication system 100. An RF scan is performed (402). For example, wireless device 130 may scan the first frequency band and/or the second frequency band and measure the signal quality of any discovered carriers (e.g., the carrier of wireless link 141).

A system information broadcast with cell loading information is received from an access node (404). For example, wireless device 130 may receive, from access node 111, a system information block. Whether an RF signal strength requirement is met is determined. If the RF signal strength requirement is met, flow proceeds to block 408. If the RF signal strength requirement is not met, flow proceeds back to block 402 (406). For example, if the RF signal strength required for network entry that is broadcast by access node 111 in a system information message is not met by access node 111, wireless device 130 may continue scanning for other access nodes on the first and/or second frequency bands.

If the RF signal strength requirement is met, it is determined whether the cell is congested. If the cell is congested, flow proceeds back to block 402. If the cell is not congested, flow proceeds to block 410. For example, wireless device 130 can check if the cell loading status meets a minimum requirement for network entry in terms of a minimum target service data rate broadcast in system information block messages from access node 111. If the cell loading status does not meet the minimum requirement for network entry, wireless device 130 may continue scanning for other access nodes on the first and/or second frequency bands.

If the cell is not congested, a connection to this access node is made (410). For example, if the cell loading status meets the minimum requirement for network entry in terms of the minimum target service data rate broadcast in system information block messages from access node 111, wireless device 130 connects to access node 111 to be serviced by access node 111 via wireless link 141.

Figure 5:
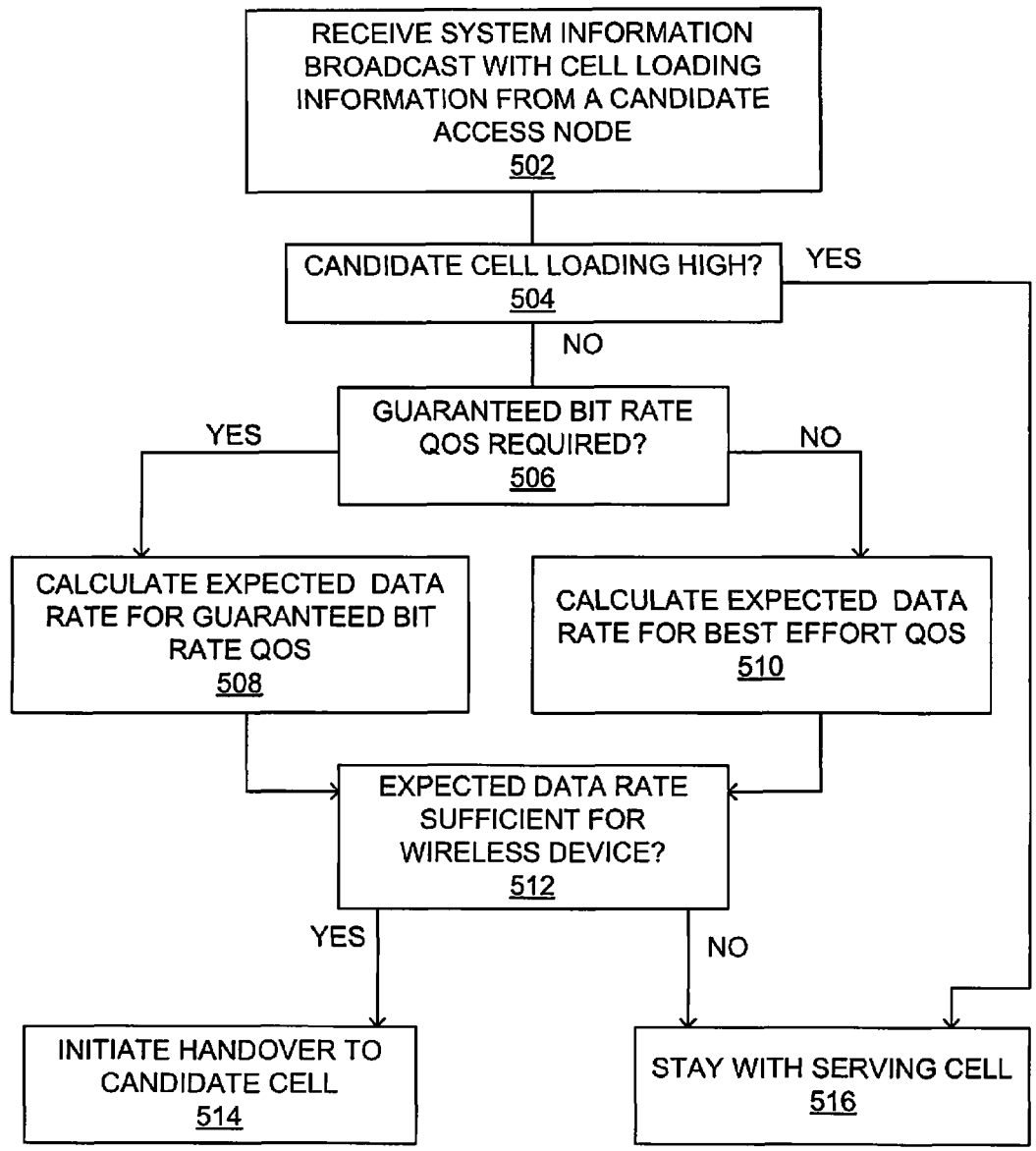
FIG. 5 is a flowchart illustrating a method determining whether to initiate a handover.

FIG. 5 is a flowchart illustrating a method determining whether to initiate a handover. The steps illustrated in FIG. 5 may be performed by one or more elements of communication system 100. From a candidate access node, a system information broadcast with cell loading information is received (502). For example, while wireless device 130 is being served by access node 111, wireless device 130 may receive a system information block broadcast by access node 112. This system information block includes cell loading information.

It is determined whether the candidate cell loading is high (504). If the cell loading information indicates the candidate cell loading is high, flow proceeds to box 516. If the candidate cell loading information indicates the candidate cell loading is not high, flow proceeds to box 506. For example, if the cell loading information associated with access node 112 indicates that access node 112 is "highly" loaded, wireless device 130 stops considering access node 112 as a candidate to service wireless device 130. If the cell loading information associated with access node 112 indicates that access node 112 is not "highly" loaded, wireless device 130 will proceed to check if guaranteed bit rate service is required.

It is determined whether guaranteed bit rate QoS is required (506). If guaranteed bit rate QoS is required, flow proceeds to box 508. If guaranteed bit rate QoS is not required, flow proceeds to box 510. For example, if wireless device 130 needs to be serviced by guaranteed bit rate QoS, wireless device 130 may proceed to calculate the expected quality of service data rate. If wireless device 130 does not require guaranteed bit rate QoS, wireless device 130 may proceed to calculate the expected best effort data rate.

If guaranteed bit rate QoS is required, an expected data rate for guaranteed bit rate QoS is calculated (508). For example, wireless device 130 may calculate the expected quality of service data rate. This calculation can use both the cell loading information received from access node 112 and one or more air-interface quality measure(s). For example, the expected QoS data rate (EDR) can be calculates as: EDR= (TCB−DCB)*(PDR/UCB), where TCB=total channel bandwidth; DCB=dedicated channel bandwidth for QoS; and, PDR/UCB is related to channel quality information (CQI). CQI is wireless device 130's requested modulation and coding scheme (MCS)—which is based on RF signal quality measures such as signal to noise ratio (SNR), signal to interference and noise ratio (SINR), carrier to interference and noise ratio (CINR), etc. After an expected data rate for guaranteed bit rate QoS is calculated, flow proceeds to box 512.

If guaranteed bit rate QoS is not required, an expected data rate for best effort QoS is calculated (510). For example, wireless device 130 may calculate the expected best effort data rate. This calculation can use both the cell loading information received from access node 112, and one or more air-interface quality measure(s). After an expected data rate for best effort QoS is calculated, flow proceeds to box 512.

It is determined whether the expected data rate is sufficient for the wireless device (512). If the expected data rate is sufficient, flow proceeds to box 514. If the expected data rate is not sufficient, flow proceeds to box 516. For example, wireless device 130 may compare the calculated expected data rate for the appropriate one of guaranteed bit rate QoS or best effort QoS (calculated previously) against a minimum service target data rate broadcast by access node 112. Wireless device 130 may determine that the expected data rate is sufficient when the calculated expected data rate exceeds the minimum service target data rate by a tolerance level. The tolerance level may be a setting specific to wireless device 130.

If the expected data rate is sufficient, the candidate access node is selected to serve the wireless device (514). In other words, if the expected data rate is sufficient, it is determined to handover the wireless device to the candidate access node. If the expected data rate is not sufficient, the current access node is selected to continue to serve the wireless device (516). In other words, if the expected data rate is not sufficient, it is determined not to handover the wireless device to the candidate access node.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access node 111, access node 112, network 120, and/or wireless device 130.

Figure 6:
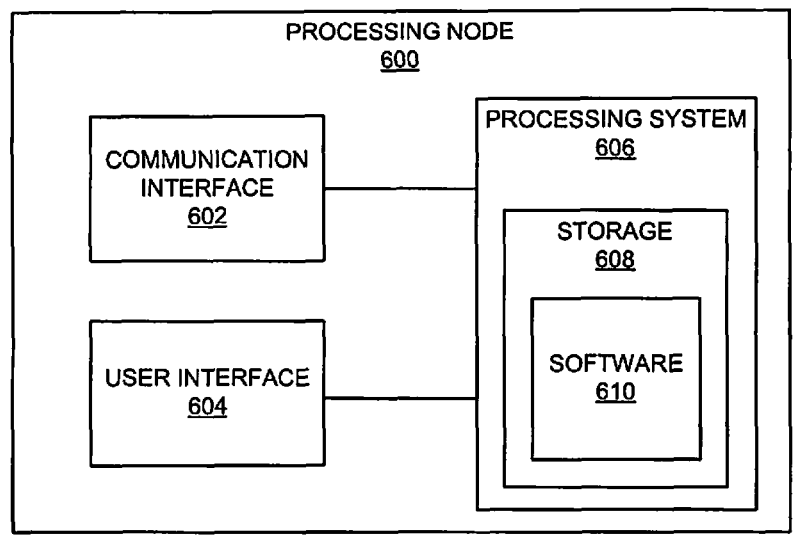
FIG. 6 illustrates a processing node.

FIG. 6 illustrates an exemplary processing node 600 comprising communication interface 602, user interface 604, and processing system 606 in communication with communication interface 602 and user interface 604. Processing node 600 is capable of paging a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include access node 111, access node 112, and wireless device 130. Processing node 600 can also be an adjunct or component of a network element, such as an element of access node 111, access node 112, network 120, and/or wireless device 130, a mobility management entity, a gateway, a proxy node, or another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, comprising:
   determining that a wireless device should seek a first access node that can provide a guaranteed bit rate service;
   receiving, by the wireless device, a system information message from the first access node using a first frequency band;
   extracting cell loading information from the system information message;
   determining an expected guaranteed bit rate based on the cell loading information and an air-interface signal strength indicator associated with the first access node; and,
   based on the extracted cell loading information, determining whether to connect the wireless device to the first access node using the first frequency band.

2. The method of claim 1, further comprising:
   based on the expected guaranteed bit rate, determining whether to connect the wireless device to the first access node using the first frequency band.

3. The method of claim 1, further comprising:
   based on the expected guaranteed bit rate, determining whether to connect the wireless device to a second access node using a second frequency band.

4. The method of claim 1, further comprising:
   determining an expected best effort bit rate based on the cell loading information and the air-interface signal strength indicator associated with the access node.

5. The method of claim 4, further comprising:
determining whether to connect the wireless device to the first access node using the first frequency band based on the expected best effort bit rate.

6. A method of operating a communication system, comprising:
receiving an indicator that a handover threshold criteria associated with a first access node serving a wireless device using a first frequency band has been met by a first signal quality level;
in response to the handover threshold criteria being met, determining if a second signal quality level of a second access node using a second frequency band meets a signal quality threshold criteria;
receiving, by the wireless device, a first system information message from the second access node using the second frequency band;
extracting first cell loading information from the first system information message; and,
determining whether to initiate a handover of the wireless device from the first access node to the second access node based on the first cell loading information and an expected data rate calculated from the first cell loading information.

7. The method of claim 6, further comprising:
determining if a third signal quality level of a third access node using the second frequency band meets the signal quality threshold criteria;
receiving, by the wireless device, a second system information message from the third access node using the second frequency band; and,
extracting second cell loading information from the second system information message.

8. The method of claim 7, further comprising:
based on the first cell loading information and the second cell loading information, associating with the second access node and the third access node, a handover priority.

9. The method of claim 8, wherein the first cell loading information is used to calculate a first guaranteed bit rate associated with the second access node and the second cell loading information is used to calculate a second guaranteed bit rate associated with the third access node, and the first guaranteed bit rate and the second guaranteed bit rate are used to determine the handover priority.

10. The method of claim 8, wherein the first cell loading information is used to calculate a first best effort bit rate associated with the second access node and the second cell loading information is used to calculate a second best effort bit rate associated with the third access node, and the first best effort bit rate and the second best effort bit rate are used to determine the handover priority.

11. The method of claim 8, wherein the first cell loading information is used to calculate a first quality of service indicator associated with the second access node and the second cell loading information is used to calculate a second quality of service indicator associated with the third access node, and the first quality of service indicator and the second quality of service indicator are used to determine the handover priority.

12. The method of claim 7, further comprising:
based on the second signal quality level and the third signal quality level, associating with the second access node and the third access node, a handover priority.

13. A communication system comprising:
a first access node configured to broadcast first cell loading information and to-serve a wireless device using a first frequency band; and,
a second access node configured to broadcast second cell loading information to the wireless device using a second frequency band,
wherein the wireless device is configured to use the first cell loading information and the second cell loading information to determine whether to initiate a handoff from the first access node to the second access node,
wherein the first access node is configured to receive, from the wireless device, a handoff priority based on an expected quality of service calculated by the wireless device, and
wherein the handoff priority is used by the first access node to determine whether to handoff the wireless device to a third access node.

14. The communication system of claim 13, wherein the handoff priority is further based on a first signal quality indicator associated with the second access node and a second signal quality indicator associated with the third access node.

* * * * *